United States Patent
Harigaya et al.

(10) Patent No.: US 6,790,592 B2
(45) Date of Patent: Sep. 14, 2004

(54) PHASE-CHANGE OPTICAL INFORMATION RECORDING MEDIUM

(75) Inventors: Makoto Harigaya, Kanagawa (JP); Katsuhiko Tani, Tokyo (JP); Noriyuki Iwata, Kanagawa (JP); Kazunori Ito, Kanagawa (JP); Hajime Yuzurihara, Kanagawa (JP); Eiko Hibino, Kanagawa (JP); Hiroko Ohkura, Kanagawa (JP); Nobuaki Onagi, Kanagawa (JP); Hiroshi Miura, Kanagawa (JP); Yoshiyuki Kageyama, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 209 days.

(21) Appl. No.: 09/951,515

(22) Filed: Sep. 14, 2001

(65) Prior Publication Data

US 2002/0098445 A1 Jul. 25, 2002

(30) Foreign Application Priority Data

| Sep. 14, 2000 | (JP) | 2000-280225 |
| Mar. 21, 2001 | (JP) | 2001-079747 |
| May 14, 2001 | (JP) | 2001-143628 |
| Sep. 11, 2001 | (JP) | 2001-275277 |

(51) Int. Cl.$^7$ ............................................. G11B 7/24
(52) U.S. Cl. ................ 430/270.13; 430/945; 428/64.5; 369/275.5; 369/275.2
(58) Field of Search ........................... 430/945, 270.13; 428/64.5; 369/275.2, 275.5

(56) References Cited

U.S. PATENT DOCUMENTS

| 5,948,496 | A | * | 9/1999 | Kinoshita et al. ...... 430/270.13 |
| 6,132,932 | A | * | 10/2000 | Miyamoto et al. ...... 430/270.13 |
| 6,268,034 | B1 | * | 7/2001 | Kitaura et al. ............. 428/64.1 |
| 6,383,595 | B1 | * | 5/2002 | Hirotsune et al. ...... 430/270.11 |
| 6,416,837 | B1 | * | 7/2002 | Kojima et al. ............. 428/64.1 |
| 2002/0021643 | A1 | * | 2/2002 | Miura et al. ............. 369/59.11 |

FOREIGN PATENT DOCUMENTS

| EP | 1056077 | * | 11/2000 |
| JP | 63-147689 | * | 6/1988 |
| JP | 01-227236 | * | 9/1989 |
| JP | 01-241040 | * | 9/1989 |
| JP | 01-267854 | * | 10/1989 |
| JP | 05-229259 | * | 9/1993 |
| JP | 09-020073 | * | 1/1997 |
| JP | 2000-079761 | * | 3/2000 |
| JP | 2000-313170 | * | 11/2000 |
| WO | 99/06220 | * | 2/1999 |

* cited by examiner

Primary Examiner—Martin Angerbrannt
(74) Attorney, Agent, or Firm—Oblon, Spivak, McClelland, Maier & Neustadt, P.C.

(57) ABSTRACT

A phase-change optical information recording medium capable of recording information therein, reproducing recorded information therefrom, rewriting recorded information, and erasing recorded information therefrom, which phase-change optical information recording medium is provided with a recording layer containing therein a phase-change recording material including Ge, Ga, Sb, Te, and one element selected from the group consisting of Mg and Ca, which recording material is capable of performing a reversible phase transition from a noncrystalline phase to a crystalline phase and vice verse with the application of an electromagnetic wave thereto.

17 Claims, 2 Drawing Sheets

PHASE-CHANGE OPTICAL INFORMATION RECORDING MEDIUM

BACKGROUND OF THE INVENTION

1. Field of the Invention

The present invention relates to a phase-change optical information recording medium, more particularly to a phase-change optical information recording medium comprising a recording layer which comprises a phase-change recording material. The phase-change recording material is capable of reversibly performing a phase change from a noncrystalline phase to a crystalline phase and vice versa with the application of an electromagnetic wave such as a laser beam thereto, whereby information can be recorded in the phase-change optical information recording medium and recorded information can be reproduced therefrom, rewritten and erased therefrom.

2. Discussion of Background

As an optical information recording medium, there is conventionally known a so-called phase-change optical disk which comprises a recording layer comprising a phase-change recording material, which recording layer is capable of recording information, reproducing recorded information, and erasing recorded information with the application of a laser beam thereto, by utilizing reversible phase-transitions between a crystalline phase and a noncrystalline phase, and/or between one crystalline phase and another crystalline phase of the phase-change recording material.

This phase-change optical disk is used as a recording medium for use with computers and also for video recording and acoustic recording due to the simplicity of an optical system that is used on a drive side thereof.

Examples of the phase-change recording materials for use in the phase-change optical disk are GeTe, GeTeSe, GeTeS, GeSeS, GeSeSbr GeAsSe, InTe, SeTe, SeAs, Ge—Te—(Sn, Au, Pd), GeTeSeSb, GeTeSb, and Ag—In—Sb—Te.

In particular, Ag—In—Sb—Te has the features that the recording sensitivity thereof is high and that the contours of amorphous portions are clear and distinct when used in the recording layer of the phase-change optical disk, so that various recording layers for mark-edge recording, using Ag—In—Sb—Te, have been developed as disclosed in Japanese Laid-Open Patent Applications 3-231889, 4-151089, 4-292779, 4-267192, 5-345478, and 6-166266.

Japanese Laid-Open Patent Application 3-231889 particularly discloses a recording medium comprising a recording layer which comprises a recording composition with a general formula of $II.(III_{1-y} \cdot IV_y) \cdot (V_{1-z} \cdot VI_z)_2$ wherein II represents an element of Group II; III, an element of Group III; IV, an element of Group IV; and VI, an element of Group VI; $0<y<1$, and $0<z<1$.

Japanese Laid-Open Patent Application 1-303643 discloses an information recording medium comprising a recording layer which is a single γ layer comprising Sb—Te as the main component, and Ag, In, Ga, Si as additional components.

The above recording media, however, have problems to be solved with respect to the requirement for high recording linear velocity and high recording density.

The phase-change recording medium, utilizing the reversible phase changes between a crystalline phase and a noncrystalline phase of the recording material, is now used worldwide as a rewritable CD.

In accordance with the worldwide spread of the use of the phase-change recording medium, a demand for high recording and reproduction linear velocity is increasing.

In the phase-change recording medium, a noncrystalline phase of the recording material is formed by heating the recording material to a high temperature near the melting point thereof, and then rapidly cooling the recording material, while a crystalline phase is formed by heating the recording material to at least a crystallization temperature thereof and then by gradually cooling the recording material. In the phase-change recording material, it is extremely important to perform the rapid cooling and the gradual cooling while maintaining a good balance of the two cooling steps.

In the phase-change recording medium, the higher the recording density, the more easily the interference between the adjacent recording marks tends to occur, and therefore, the more quickly the recording medium tends to deteriorate. Therefore, in order to attain recording at high speed and high density, the choice of (1) the materials for the phase-change recording layer and (2) the medium structure has to be optimized.

SUMMARY OF THE INVENTION

It is therefore an object of the present invention to provide a phase-change optical information recording medium which is free of the above-mentioned conventional problems, and is capable of recording information at high liner velocity and high density and has excellent archival memory characteristics, that is, excellent recorded data retaining characteristics.

The object of the present invention can be achieved by a phase-change optical information recording medium comprising a recording layer which comprises a phase-change recording material. The phase-change recording material comprises Ge, Ga, Sb, Te, and one element selected from the group consisting of Mg and Ca, and is capable of performing a reversible phase transition from a noncrystalline phase to a crystalline phase and vice versa with the application of an electromagnetic wave thereto.

In the above phase-change optical information recording medium, the phase-change recording material may be a material with a formula of $Ge_a Ga_b Sb_c Te_d M_e$ in which M represents Mg or Ca, and $1 \leq a \leq 7$, $2 \leq b \leq 8$, $60 \leq c \leq 85$, $15 \leq d \leq 35$, and $0 < e \leq 3$ in terms of atomic %.

Furthermore, in the abode phase-charge optical information recording medium, the phase-change recording material may further comprise at least one additional element selected from the group consisting of Ag, Au, Cu, B, In, Si, C and N.

In the phase-change optical information recording medium, it is preferable that the additional element be in an amount of 3 atomic % or less in the phase-change recording material.

In the above phase-chance optical information recording medium, it is preferable that the phase-change recording material comprise Ge, Ga, Sb, Te, one element selected from the group consisting of Mg and Ca, and Ag.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

The structure of an example of the phase-change optical information recording medium of the present invention will now be explained with reference to FIG. 1.

Figure 1:
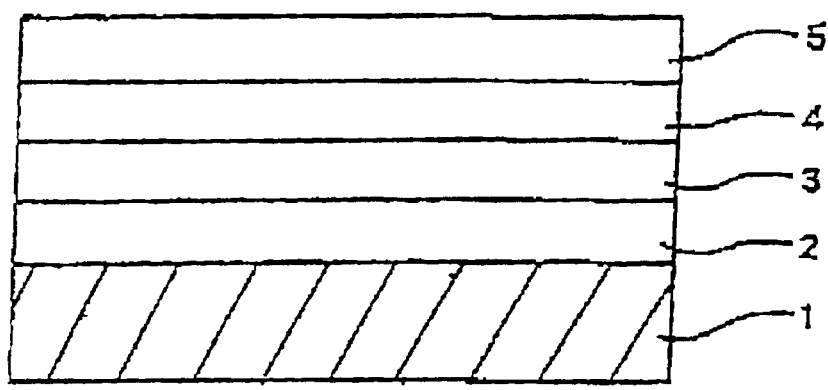
FIG. 1 is a schematic cross-sectional view of an example of the phase-change optical information recording medium of the present invention.
Figure 2:
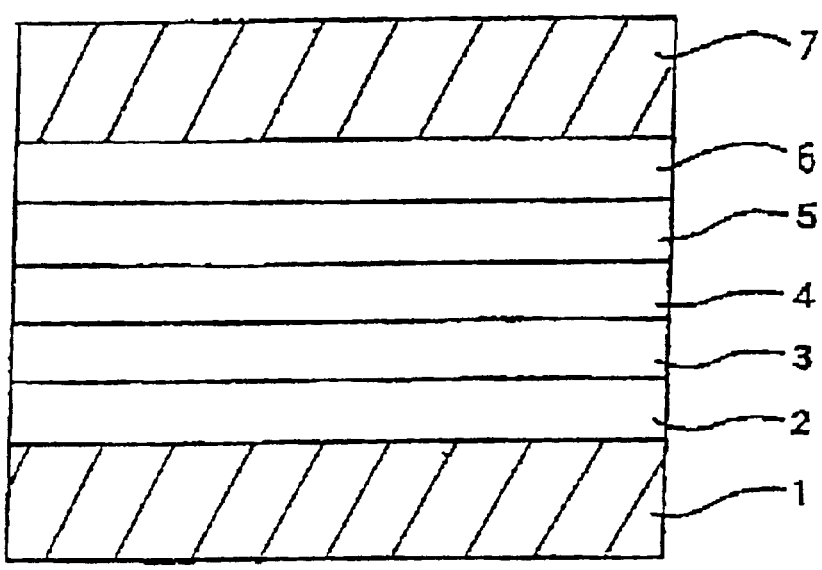
FIG. 2 is a schematic cross-sectional view of another example of the phase-change optical information recording medium of the present invention.

In FIG. 1, reference numeral 1 indicates a substrate. On the substrate 1, there are successively overlaid a lower protective layer 2, a recording layer 3, an upper protective layer 4, and a reflection layer 5 as shown in FIG. 1.

It is not always necessary to provide the two protective layers 2 and 4 so as to hold the recording layer 3 therebetween. However, when the substrate 1 is made of a material with a low heat resistance, such as polycarbonate, it is preferable to provide the lower protective layer 2 as well as the upper protective layer 4.

An intermediate layer (not shown) can also be interposed between the upper protective layer 4 and the reflection layer 5. By the provision of the intermediate layer between the upper protective layer 4 and the reflection layer 5, the occurrence of chemical reactions between the upper layer 4 and the reflection layer 5 can be hindered, and therefore the archival memory characteristics of the recording medium can be improved.

Furthermore, by causing the intermediate layer to have some optical function, the signal characteristics of the recording medium can also be improved. This is particularly effective for the improvement of the DOW (Direct Overwrite) characteristics of the recording medium.

As the materials for the substrate 1, glass, ceramics, and resins are usually used. It is preferable to use a resin substrate in view of the molding properties and the cost thereof.

Representative examples of resins for the resin substrate are polycarbonate resin, acrylic resin, epoxy resin, polystyrene resin, acrylonitrile-styrene copolymer resin, polyethylene resin, polypropylene resin, silicone resin, fluorine plastics, ASS resin, and urethane resin. Of these resins, polycarbonate is lost preferable from the viewpoints of the workability and the optical characteristics thereof.

The substrate 1 may be shaped into a disk, a card or a sheet.

The phase-change recording material of the recording layer 3 for use in the present invention is a phase-change recording material comprising Ge, Ga, Sb, Te, and one element selected from the group consisting of Mg and Ca. As example of The phase-change recording material is a material with a formula of $Ge_aGa_bSb_cTe_dM_e$ in which M represents Mg or Ca, and $1 \leq a \leq 7$, preferably $2 \leq a \leq 5$; $2 \leq b \leq 8$, preferably $3 \leq b \leq 5$; $60 \leq c \leq 85$, preferably $70 \leq c \leq 80$; $15 \leq d \leq 35$, preferably $16 \leq d \leq 22$; and $0 < e \leq 3$, preferably $0.5 \leq e \leq 2$, in terms of atomic %.

When the amount of Ge is less than 1 atomic %, the archival memory characteristics of the phase-change optical information recording medium tend to be impaired, while when the amount of Ge is more than 7 atomic %, recording at the higher recording linear velocity tends to become difficult to be carried out.

When the amount of Ga is less than 2 atomic %, recording at the higher recording linear velocity tends to become difficult to be carried out, while when the amount of Ga is more than 8 atomic %, the signal characteristics of the phase-change optical information recording medium tend to be impaired. The impairment of the signal characteristics caused by the increase in the amount of Ga is due to the improper initialization of the phase-change optical information recording medium. In this case, the signal characteristics remain impaired even at the lower recording linear velocity.

When the amount of Sb is less than 60 atomic %, recording at the higher recording linear velocity tends to become difficult to be carried out, while when the amount of Sb is more than 85 atomic %, the archival memory characteristics of the phase-change optical information recording medium tend to be impaired as is demonstrated in the examples described later.

When the amount of Te is less than 15 atomic %, the DOW (direct overwrite characteristics) of the phase-change optical information recording medium tend to be impaired, while when the amount of Te is more than 35 atomic %, recording at the higher recording linear velocity tends to became difficult to be carried out.

When neither Mg nor Ca is contained, recording at the higher recording linear velocity cannot be carried out, while when the amount of Mg or Ca is more than 3 atomic %, the archival memory characteristics of the phase-change optical information recording medium tend to be impaired.

The phase-change recording material may further comprise at least one additional element selected from the group consisting of Ag, Au, Cu, B, In, Si, C and N, preferably at least one additional element selected from the group consisting of Ag, Cu, and In, more preferably Ag, in an amount of 3 atomic % or less, preferably in an amount of 0.01 atomic % to 2 atomic %, more preferably in an amount of 0.1 atomic % to 1 atomic %, in the phase-change recording material.

The above-mentioned additional elements are effective for the improvement of the archival memory characteristics of the phase-change optical information recording medium of the present invention. Of these additional elements, Ag is particularly effective for the improvement of the archival memory characteristics.

Specific examples of the phase-change recording material are phase-change recording materials comprising Ge, Ga, Sb, Te, one element selected from the group consisting of Mg and Ca, and Ag, such as $Ge_5Ga_3Sb_{71}Te_{18}Mg_3$, $Ge_3Ga_3Sb_{76}Te_{16}Mg_2$, $Ge_2Ga_3Sb_{75}Te_{18}Mg_2$, and $Ge_2Ga_5Sb_{74}Te_{18}Mg_1$.

The recording layer 3 can be generally formed by the sputtering method. It is preferable that the recording layer 3 haze a thickness of 10 nm to 100 nm, more preferably a thickness of 10 nm to 25 nm. When the thickness of the recording layer 3 is thinner than 10 nm, the recording layer 3 loses the recording function as recording layer due to the lowering of its light absorption performance, while when the recording layer 3 is thicker than 100 nm, the amount of light that passes through the recording layer is decreased and no light interference effect is expected.

The materials for the protective layers 2 and 4 are metal oxides such as SiO, $SiO_2$, $ZnO \cdot SnO_2$, $ZnS \cdot SiO_2$, $Al_2O_3$, TiO2, $In_2O_3$, MgO, and $ZrO_2$; nitrides such as $Si_2N_3$, CeN, AlN, TiN, BN, and ZrN; suLfides such as ZnS, $In_2S_3$, and $TaS_4$; carbides such as SiC, TaC, $B_4C$, WC, TiC, and ZrC, diamond-like carbon, and mixtures thereof. These materials can be used not only individually, but also in combination in the protective layers 2 and 4.

Furthermore, these materials may contain impurities, when necessary. It is required that the protective layers 2 and 4 have a higher melting point than that or the recording layer 3. It is also required that the protective layers 2 and 4 have a high thermal conductivity, a low coefficient of thermal expanse on, and good adhesion properties.

It is preferable that the lower protective layer 2 have a thickness of 20 nm to 300 nm, more preferably a thickness of 35 nm to 200 nm. When the thickness of the lower protective layer 2 is thinner than 20 nm, the lower protective layer 2 does not function as a lower protective layer, while when the thickness thereof is greater than 300 nm, the lower protective layer 2 tends to peel away from the recording layer 3.

It is preferable that the upper protective layer 4 have a thickness of 5 nm to 100 nm, more preferably a thickness of 5 nm to 20 nm. When the thickness of the upper protective layer 4 is thinner than 5 nm, the upper protective layer 4 does not function as a barrier between the recording layer 3 and the reflection layer 5, while when the thickness thereof is greater than 100 nm, the upper protective layer 4 tends to peel away from the recording layer 3 and to be deformed, and the overwrite characteristics of the recording medium tend to be impaired due to the lowering of the heat dissipation properties thereof.

The material for the reflection layer 5 is a metal such as Al, Au, Cu, Ag, Cr, Sn, Zn, In, Pd, Zr, Fe, Co, Ni, Si, Ge, Sb, Ta, W, Ti, and Pb, and alloys thereof.

The reflection layer 5 may be formed in an overlaid layer made of a plurality of layers, each layer made of a different metal or alloy.

Ag has a high thermal conductivity and an Ag alloy made of Ag with the addition thereto of a small amount of Cu and/or Ni has an improved environmental resistance. These Ag and the Ag alloy are effective for reducing jitters and therefore are preferable for use in the reflection layer 5.

The addition of Cu and/or Ni to Ag is effective for preventing the oxidation of Ag, controlling the increasing of the particle diameter of Ag, and preventing the reduction of the reflection ratio and the thermal conductivity thereof.

As the material for the intermediate layer, for example, SiC, Si, and Ge can be employed. It is preferable that the intermediate layer have a thickness of 2 nm to 10 nm, more preferably a thickness of 3 nm to 6 nm. An intermediate layer with a thickness of less than 2 nm is difficult to form with a uniform thickness, and such a thin intermediate layer will not function as an intermediate layer since the upper protective layer 4 may come into contact with the reflection layer 5. On the other hand, when the thickness of the intermediate layer is greater than 10 nm, heat dissipation from the upper protective layer 4 to the reflection layer 5 becomes disadvantageously poor.

The above-mentioned protective layers, reflection layer and recording layer can be formed by various vapor phase epitaxies such as vacuum deposition method, sputtering method, plasma enhanced CVD (Chemical Vapor Deposition) photo CVD, ion plating method and electron beam deposition.

The phase-change optical information recording medium of the present invention is not necessarily limited to the above-mentioned recording media comprising the various layers, but may be such a phase-change optical recording medium comprising an organic protective layer provided on the reflection layer, which organic protective layer may be stuck on the reflection layer, using an adhesive agent.

The phase-chance optical information recording medium of the present invention is capable of recording information therein and reproducing recorded information therefrom, using a laser beam with a wavelength in the range of 400 nm to 780 nm.

In order to increase the recording density, it is preferable that the NA (numerical aperture) of an objective lens be 0.60 or more, and that the beam diameter of incident light be reduced. It is preferable that the wavelength of the laser beam be 650 nm, the numerical aperture of the objective lens be 0.60 to 0.65, the thickness of the substrate be 0.6 mm, the track pitch of the substrate be 0.74 $\mu$m or less, the depth of the groove in the substrate be in the range of 15 nm to 60 nm, and the width of the groove be in the range of 0.2 $\mu$m to 0.3 $\mu$m.

It is preferable that a maximum recording liner velocity be 20 m/s, and that a maximum recording frequency be about 150 MHz at a bit length of 0.267 $\mu$m/bit. A preferable recording linear velocity is in the range of 6.5 m/s to 17.5 m/s.

Other features of this invention will become apparent in the course of the following description of exemplary embodiments, which are given for illustration of the invention and are not intended to be limiting thereof.

EXAMPLE 1

[Fabrication of Disk-shaped Phase-change Optical Information Recording Medium No. 1]

A disk-shaped polycarbonate substrate with a diameter of 12 cm and a thickness of 0.6 mm, provided with a groove with a track pitch of 0.74 $\mu$m, was subjected to a high-temperature dehydration treatment, whereby a dehydrated polycarbonate substrate 1 was prepared.

As illustrated in FIG. 1, on the thus dehydrated polycarbonate substrate 1, a lower protective layer 2, a recording layer 3, an upper protective layer 4, and a reflection layer 5 were successively overlaid by sputtering.

The lower protective layer 2 was a dielectric layer with a composition of ZnS·SiO$_2$, having a thickness of 70 nm.

The composition of the recording layer 3 was Ge$_5$Ga$_3$Sb$_{71}$Te$_{18}$Mg$_3$ and the thickness thereof was 20 nm.

The upper protective layer 4 was an overlaid composite layer composed of (1) a dielectric layer with a Composition of ZnS·SiO$_2$, having a thickness of 10 nm, and (2) a layer with a composition of SiC, having a thickness of 5 nm.

The reflection layer 5 was made of Ag, with a thickness of 140 nm.

On the reflection layer 5, an organic protective layer 6 was provided by coating an acrylic ultraviolet curing resin with a thickness of 5 $\mu$m to 10 $\mu$m, using a spinner, and then subjecting the coated acrylic ultraviolet curing resin to ultraviolet curing.

On the organic protective layer 6, a polycarbonate disk 7 with a diameter of 12 cm and a thickness of 0.6 mm, which was subjected to the same high temperature dehydration treatment as that for the above-mentioned dehydrated polycarbonate substrate 1, was overlaid and stuck thereon, using an adhesive sheet, whereby a disk-shaped phase-change optical information recording medium No. 1 of the present invention (hereinafter referred to as recording disk No. 1) as illustrated in FIG. 1 was fabricated.

[Evaluation of Disk-shaped Phase-change Optical Information Recording Medium No. 1]

The recording disk No. 1 of the present invention was then evaluated with respect to (1) the signal characteristics and (2) the archival memory characteristics in terns of the jitters of information recorded therein.

For the evaluation, to begin with, the recording disk No. 1 was initialized by crystallizing the recording layer 3 thereof with the application of a laser beam with a wavelength of 910 nm thereto using an initialization apparatus under the initialization conditions that the power of the laser beam for the initialization was 800 mW, the feed speed of a head for the laser beam was 36 μm per revolution, that is, 36 μm/r, and the linear velocity for the initialization was 3 m/s.

Recording information and reproduction of recorded information were then conducted with the application of a laser beam with a wavelength of 655 nm, using a pickup device with a NA (Numerical Aperture) of 0.65. In the recording, an EFM+ modulation method was employed.

The recording was conducted with a bit length of 0.267 μm/bit at a recording linear velocity of 8.5 m/s or 17.5 m/s.

The reproduction was conducted a: a reproduction linear velocity of 3.5 m/s.

Figure 3:
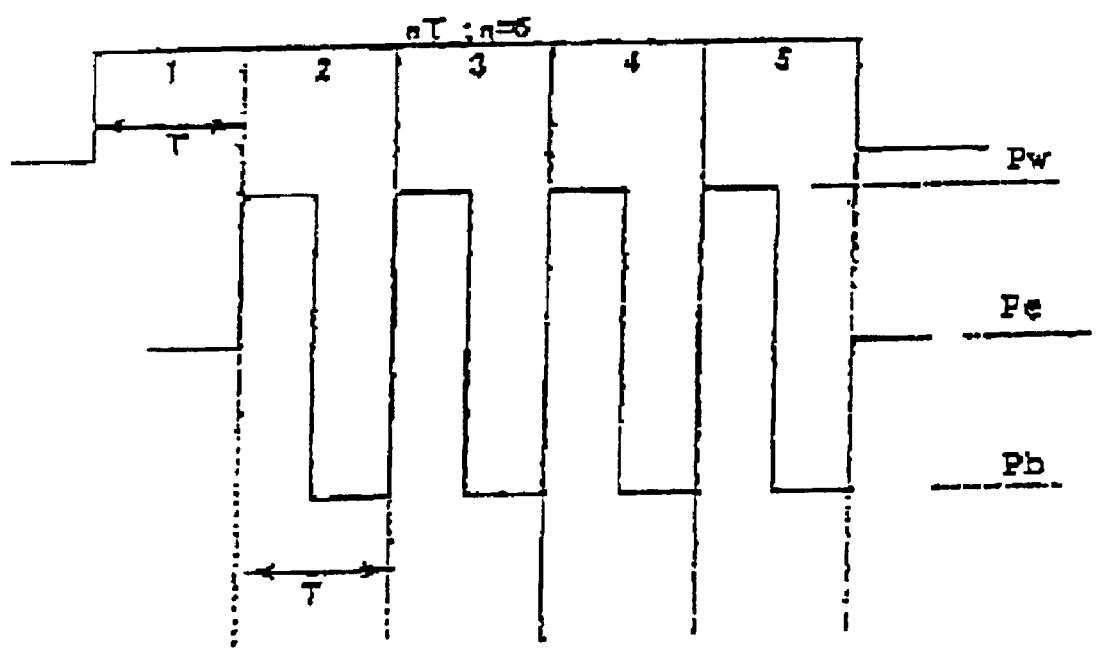
FIG. 3 is a diagram of a 5T mark recording strategy for use in the present invention.

FIG. 3 shows an example of a recording strategy for 5T marks for this recording, in which recording power Pw was set at 15 mW, erasing power Pe, at 7 mW, and bias power Pb, at 0.7 mW.

The jitters in the recording disk No. 1 of the present invention were measured in terms of "data to clock" by subjecting the recording disk No. 1 to 10 times direct overwriting, which is abbreviated to DOW10 in TABLE 2, and also by subjecting the recording disk No. 1 to 1000 times direct overwriting, which is abbreviated to DOW1000 in TABLE 2, at a recording linear velocity of 8.5 m/s, and also at a recording linear velocity of 17.5 m/s.

In the recording strategy, when the recording linear velocity was 8.5 m/s, the pulse width was 7 ns, while when the recording velocity was 17.5 m/s, the pulse width was 3 ns.

The results of the evaluation of the signal characteristics of the recording disk No. 1 are shown in TABLE 2.

The archival memory characteristics of the recording disk No. 1 were also measured in terms of the jitters therein by subjecting the recording disk No. 1 to 10 times direct overwriting at a recording linear velocity of 8.5 m/s, and preserving the recording medium No. 1 at 80° C., 85%RP for 200 hours. Then the jitters in the recording medium No. 1 were measured, whereby the recording medium No. 1 was evaluated with respect to the archival memory characteristics. The results of the evaluation are shown in TABLE 3.

EXAMPLES 2 to 4 and Comparative Examples 1 and 2

[Fabrication of Disk-shaped Phase-change Optical Information Recording Media No. 2 to No. 4 and Comparative Disk-shaped Phase-change Optical Information Recording Media No 1 and No. 2]

Disk-shaped phase-change optical information recording media No. 2 to No. 4 of the present invention (hereinafter referred to as recording disks No. 2 to No. 4) and comparative disk-shaped phase-change optical information recording media No. 1 and No. 2 (hereinafter referred to as comparative recording disks No. 1 and No. 2) were fabricated in the same manner as for the recording disk No. 1 in Example 1 except that the composition of the recording layer 3 in Example 1 was changed to those as shown in TABLE 1.

[Evaluation of Disk-shaped Phase-change Optical Information Recording Media No. 2 to No. 4 and Comparative Disk-shaped Phase-change Optical Information Recording Media No. 1 and No. 2]

The recording disks No. 2 to No. 4 and the comparative recording disks No. 1 and No. 2 were evaluated with respect to (1) the signal characteristics and (2) the archival memory characteristics in terms of the jitters of information recorded therein in the same manner as for the recording disk No. 1 in Example 1.

The results of the evaluations are shown in TABLE 2.

TABLE 1

| | Composition of Recording Layer |
|---|---|
| Example 1 | $Ge_5Ga_3Sb_{71}Te_{18}Mg_3$ |
| Example 2 | $Ge_3Ga_3Sb_{76}Te_{16}Mg_2$ |
| Example 3 | $Ge_2Ga_3Sb_{75}Te_{18}Mg_2$ |
| Example 4 | $Ge_2Ga_5Sb_{74}Te_{18}Mg_1$ |
| Comparative Example 1 | $Ge_3Ga_3Sb_{75}Te_{19}$ |
| Comparative Example 2 | $Ge_2Ga_1Sb_{75}Te_{18}Mg_4$ |

TABLE 2

| | Jitters (%) (Recording linear Velocity 8.5 m/s) | | Jitters (%) (Recording linear Velocity 17.5 m/s) | |
|---|---|---|---|---|
| | DOW 10 | DOW 1000 | DOW 10 | DOW 1000 |
| Ex. 1 | 6.8 | 7.9 | 7.0 | 8.2 |
| Ex. 2 | 6.2 | 7.5 | 6.8 | 8.0 |
| Ex. 3 | 6.5 | 7.7 | 7.4 | 8.5 |
| Ex. 4 | 7.1 | 8.0 | 7.2 | 8.3 |
| Comp. Ex. 1 | 7.2 | 8.1 | 11.3 | 13.1 |
| Comp. Ex. 2 | 6.9 | 8.3 | 8.7 | 9.6 |

TABLE 3

| | Archival Memory Characteristics (jitters after the reservation at 80° C., 85% RH for 200 hrs.) |
|---|---|
| Ex. 1 | 7.0 |
| Ex. 2 | 7.1 |
| Ex. 2 | 7.2 |
| Ex. 4 | 7.2 |
| Comp. Ex. 1 | 8.3 |
| Comp. Ex 2 | 10.5 |

The results of the -valuations of the recording disks No. 1 to No. 4 of the present invention and the comparative recording disks No. 1 and No. 2, shown in TABLES 2 and 3, indicate that in contrast to the comparative recording disks No. 1 and No. 2, the recording disks No. 1 to No. 4 of the present invention exhibited excellent signal characteristics in repeated use thereof either at a lower recording linear velocity of 8.5 m/s or at a higher recording linear velocity of 17.5 m/s, and excellent archival memory characteristics.

More specifically, the recording disks No. 1 to No. 4 of the present invention, the recording layer thereof comprising a phase-change recording material which comprises Ge, Ga, Sb, Te, and Mg, exhibited the excellent signal characteristics in view of the jitters thereof, including the repeated use characteristics thereof, either at the lower recording linear velocity of 8.5 m/s or at the higher recording linear velocity of 17.5 m/s.

In contrast to this, the comparative recording disk No. 1 in Comparative Example 1, the recording layer thereof comprising a phase-change recording material which comprises Ge, Ga, Sb, and Te, exhibited relatively good jitter characteristics at the lower recording linear velocity of 8.5 m/s, but at the higher recording linear velocity of 17.5 m/s, the jitters thereof were so increased that the comparative recording disk No. 1 did not satisfy the specification requirement for use in DVD that the jitters be not more than 9%. This indicates that the element Mg plays an extremely important role when recording at the higher recording linear velocity of 17.5 m/s.

Comparisons between the recording disks No. 1 to No. 4 of the present invention and the comparative recording disk no. 2 in Comparative Example 2 indicate that in the recording disks No. 1 to No. 4 of the present invention, the jitters hardly changed even after the reservation thereof at 80° C., 85%RH for 200 hours, but in the comparative recording disk No. 1, the jitters were so increased after the preservation that the comparative recording disk No. 2 did not satisfy the above-mentioned specification requirement for use in DVD. This indicates that the excessive addition of the element Mg beyond the effective at the higher recording linear velocity impairs the archival memory characteristics of the recording disk. When the element Mg was replaced by Ca, the same effects as those obtained by use of Mg were obtained.

Japanese Patent Applications No. 2000-280225 filed Sep. 14, 2000, No. 2001-79747 filed Mar. 21, 2001, and No. 2001-143628 filed May 14, 2001, and Japanese Patent Application filed Sep. 11, 2001, are hereby incorporated by reference.

What is claimed is:

1. A phase-change optical information recording medium comprising a recording layer which comprises a phase-change recording material, said phase-change recording material comprising Ge, Ga, Sb, Te, and one element selected from the group consisting of Mg and Ca, wherein said phase-change recording material is represented by a formula of $Ge_aGa_bSb_cTe_dM_e$ in which M represents Mg or Ca, and $1 \leq a \leq 7$, $2 \leq b \leq 8$, $71 \leq c \leq 85$, $15 \leq d \leq 35$, and $0 < e \leq 3$ in terms of atomic %, and being capable of performing a reversible phase transition from a noncrystalline phase to a crystalline phase and vice versa with the application of an electromagnetic wave thereto.

2. The phase-change optical information recording medium as claimed in claim 1, wherein said phase-change recording material further comprises at least one additional element selected from the group consisting of Ag, Au, Cu, B, In, Si, C and N.

3. The phase-change optical information recording medium as claimed in claim 2, wherein said additional element is in an amount of 3 atomic % or less in said phase-change recording material.

4. The phase-change optical information recording medium as claimed in claim 3, wherein said phase-change recording material further comprises Ag.

5. The phase-change optical information recording medium as claimed in claim 2, wherein said additional element is in an amount ranging from 0.01 to 2 atomic % in said phase-change recording material.

6. The phase-change optical information recording medium as claimed in claim 2, wherein said additional element is in an amount ranging from 0.1 to 1 atomic % in said phase-change recording material.

7. The phase-change optical information recording medium as claimed in claim 1, wherein M represents Mg.

8. The phase-change optical information recording medium as claimed in claim 1, wherein M represents Ca.

9. The phase-change optical information recording medium as claimed in claim 1, wherein said recording medium further comprises a substrate and at least one additional layer selected from the group consisting of a protective layer, a lower protective layer, an intermediate layer, an upper protective layer, and a reflection layer.

10. The phase-change optical information recording medium as claimed in claim 9, wherein said substrate is selected from the group consisting of glass, ceramic, a polycarbonate resin, an acrylic resin, an epoxy resin, a polystyrene resin, an acrylonitrile-styrene copolymer resin, a polyethylene resin, a polypropylene resin, a silicone resin, a fluorine plastic, an ABS resin, and a urethane resin.

11. The phase-change optical information recording medium as claimed in claim 9, wherein said substrate is in the shape of a disk, a card, or a sheet.

12. The phase-change optical information recording medium as claimed in claim 1, wherein said phase-change recording material is selected from the group consisting of $Ge_5Ga_3Sb_{71}Te_{18}Mg_3$, $Ge_3Ga_3Sb_{76}Te_{16}Mg_2$, $Ge_2Ga_3Sb_{75}Te_{18}Mg_2$, and $Ge_2Ga_5Sb_{74}Te_{18}Mg_1$.

13. The phase-change optical information recording medium as claimed in claim 1, wherein said recording layer has a thickness ranging from 10 to 100 nm.

14. The phase-change optical information recording medium as claimed in claim 1, wherein said recording layer has a thickness ranging from 10 to 25 nm.

15. The phase-change optical information recording medium as claimed in claim 1, wherein said phase-change optical information recording medium further comprises at least one protective layer wherein said protective layer contains one or more materials selected from the group consisting of metal oxides, metal nitrides, metal sulfides, metal carbides, and mixtures thereof, wherein said protective layer has a higher melting point than the recording layer, said protective layer has a high thermal conductivity, a low coefficient of thermal expansion, and adhesive properties.

16. The phase-change optical information recording medium as claimed in claim 1, wherein said phase-change optical information recording medium further comprises at least one reflection layer wherein said reflection layer contains one or more metals selected from the group consisting of Al, Au, Cu, Ag, Cr, Sn, Zn, In, Pd, Zr, Fe, Co, Ni, Si, Ge, Sb, Ta, W, Ti, Pb, and alloys thereof.

17. The phase-change optical information recording medium as claimed in claim 1, wherein said phase-change optical information recording medium further comprises at least one intermediate layer wherein said intermediate layer contains one or more materials selected from the group consisting of SiC, Si, and Ge, and said intermediate layer has a thickness ranging from 2 to 10 nm.

* * * * *